(12) United States Patent
Shastri et al.

(10) Patent No.: US 6,845,485 B1
(45) Date of Patent: Jan. 18, 2005

(54) METHOD AND APPARATUS FOR INDICATING STORY-LINE CHANGES BY MINING CLOSED-CAPTION-TEXT

(75) Inventors: Vijnan Shastri, Encinitas, CA (US); Indranil Chakraborty, San Diego, CA (US)

(73) Assignee: HOTV, Inc., San Diego, CA (US)

( * ) Notice: Subject to any disclaimer, the term of this patent is extended or adjusted under 35 U.S.C. 154(b) by 860 days.

(21) Appl. No.: 09/586,538

(22) Filed: May 31, 2000

Related U.S. Application Data

(63) Continuation-in-part of application No. 09/354,525, filed on Jul. 15, 1999, now abandoned.

(51) Int. Cl.[7] .............................................. G06F 17/00
(52) U.S. Cl. ...................................... 715/530; 715/531
(58) Field of Search ................................ 715/530, 531, 715/501.1; 345/719, 723; 348/553; 386/52, 69

(56) References Cited

U.S. PATENT DOCUMENTS

| | | | | |
|---|---|---|---|---|
| 5,805,156 | A | * | 9/1998 | Richmond et al. ........... 345/723 |
| 6,198,511 | B1 | * | 3/2001 | Matz et al. .................. 348/553 |
| 6,263,507 | B1 | * | 7/2001 | Ahmad et al. ............... 725/134 |
| 6,430,357 | B1 | * | 8/2002 | Orr .............................. 386/69 |
| 6,473,778 | B1 | * | 10/2002 | Gibbon .................... 715/501.1 |
| 6,580,437 | B1 | * | 6/2003 | Liou et al. .................. 345/719 |
| 6,618,547 | B1 | * | 9/2003 | Peters et al. .................. 386/52 |

\* cited by examiner

*Primary Examiner*—Sanjiv Shah
(74) *Attorney, Agent, or Firm*—Donald R. Boys; Central Coast Patent Agency, Inc.

(57) ABSTRACT

An automated video editing and indexing system is taught which has application for such tasks as creating a presentation for a video magazine and processing collections of video material in general. The system extracts text either from closed captions (CC) contained in the analog video presentation, or extracted from the voice contained in the presentation by voice-to-text techniques, time-stamps the CC text in text files according to position in the video presentation, and digitizes the video presentation. The text files and digitized video are sent to an editing station, where the CC text is analyzed using Natural Language Processing and other techniques to determine topic changes in the presentation. Keyframes are selected to represent the topic changes, and become thumbnails useful in indexing; indexing meaning marking the video material at points of topic changes, and in some cases jumping the video presentation to the positions represented by the thumbnails. In some cases selected CC text is associated with the thumbnails, and displayed in the video magazine as each thumbnail is selected by mouseover.

13 Claims, 8 Drawing Sheets

METHOD AND APPARATUS FOR INDICATING STORY-LINE CHANGES BY MINING CLOSED-CAPTION-TEXT

CROSS-REFERENCE TO RELATED DOCUMENTS

The present invention is a continuation-in-part to a patent application Ser. No. 09/354,525 entitled "Media-Rich Interactive Video Magazine" filed on Jul. 15, 1999, now abandoned, disclosure of which is incorporated herein by reference.

FIELD OF THE INVENTION

The present invention is in the field of video broadcasting, and pertains more particularly to methods and apparatus for generating interactive thumbnails representing story-line-changes associated with a media-rich presentation by exploiting CC text.

BACKGROUND OF THE INVENTION

With continuing development of new and better ways of delivering television and other video presentations to end users, and parallel development of computerized information systems, such as the Internet and the associated World Wide Web (WWW), there have been concerted efforts to integrate various systems to provide enhanced information delivery and entertainment systems. For example, developers are introducing integrated systems combining TVs with computer subsystems, so a TV may be used as a WEB browser, or a PC may be used for enhanced TV viewing.

In some systems computer elements, such as a CPU, memory, and the like, are built into the familiar chassis of a TV set. In such a system, the TV screen becomes the display monitor in the computer mode. In such a system, conventional TV elements and circuitry are incorporated along with the computer elements, and capability is provided for a user to switch modes, or to view recorded or broadcast video with added computer interaction. One may thus, with a properly equipped system, select to view analog TV programs, digital TV programs, conventional cable TV, satellite TV, pay TV from various sources, and browse the WWW as well, displaying WEB pages and interacting with on-screen fields and relational systems for jumping to related information, databases, and other WEB pages. The capabilities are often integrated into a single display, that is, one may view a broadcast presentation and also have a window on the display for WEB interaction.

In some other systems, computer elements are provided in an enclosure separate from the TV, often referred to in the art as a set-top box. Set-top box systems have an advantage for providers in that they may be connected to conventional television sets, so end users don't have to buy a new TV along with the computer elements.

In such integrated systems, whether in a single enclosure or as set-top box systems, user input is typically through a hand-held device quite similar to a familiar remote controller, usually having infra-red communication with the set-top box or a receiver in the integrated TV. For computer modes, such as WEB browsing, a cursor is displayed on the TV screen, and cursor manipulation is provided by buttons or other familiar pointer apparatus on the remote. Select buttons are also provided in the remote to perform the familiar function of such buttons on a pointer device, like a mouse or trackball more familiar to computer users.

Set-top boxes and computer-integrated TVs adapted as described above typically have inputs for such as a TV antenna (analog), cable TV (analog or digital), more recently direct-satellite TV (digital), and may also connect to video cassette recorders and to mass storage devices such as hard disk drives and CD-ROM drives to provide a capability for uploading video data from such devices and presenting the dynamic result as a display on the TV screen.

The inventors note that the innovations and developments described above provide enhanced ability to view and interact with video presentations, and that the quality of presentation and efficiency of interaction will be at least partly a function of the computer power provided and the sophistication and range of the hardware and software.

The present inventors have noted that even with the advances in hardware and software so far introduced in the art, there is still considerable room for improvement, and the inventors have accordingly provided a unique system for processing video streams, determining topic changes, and marking the streams at topic change points with thumbnails, in some cases annotated. The system is particularly useful for preparing and presenting media-rich interactive video presentations termed I-Mag by the inventors Digital content presented in the interactive magazine taught by the co-related patent specification listed in the cross-reference section is generated in many instances from broadcast analog content that is converted to digital video during off-line authoring processes. Interactive thumbnails representing entry points to new video content offered in the video magazine are generated using scene-change-detection technologies (SCD) and presentation time stamp (PTS) technologies, both of which are known in the art and to the inventor. SCD uses significant color changes to overall color levels from frame to frame to determine when a new video segment or a significant story change has occurred in a video presentation. In this way, thumbnail pictures may be presented in a user-interface along with the video that is currently playing such that a user may interact with the thumbnails to jump to the represented portion of the video presentation or obtain additional information related to that section of the magazine or video segment.

In combination with SCD software, an off-line video editor must manually group and sort such thumbnail pictures for presentation in the interactive magazine. In many cases, an editor will view a presentation off-line while performing editing processes using automated as well as manual software processes to accomplish the task of completing an interactive magazine that is ready for download to users interacting with a central WEB-based server. Such off-line processing can be time consuming and can, at times, command considerable resources both human and machine.

It has occurred to the inventors that the time and resource dedicated to off-line authoring of raw video content that will eventually be included, for example, in an interactive video magazine, or for any other use, may be considerably reduced through automated processing. This requires that a more exact method than SCD be used for determining where content and topic changes occur in a video presentation. SCD technology, while very helpful, remains a non-exact procedure for determining scene changes requiring human supervision in order to correct mistakes made by the software. Moreover, success of SCD techniques may rely heavily on the type and format of raw content to be authored.

Interactive video content presented in the interactive magazine as known to the inventors is derived largely from analog video content that has been previously broadcast to the public such as news programs, movies made for TV, educational programs, and so on. Many of these programs are segmented such as a news program wherein several different stories are covered before going to a commercial break. It becomes difficult for an editor using SCD technology using color change detection to determine, for example, the point at which one story ends and another begins in a news cast.

Therefore, what is clearly needed is a method and apparatus that can be used to automatically and accurately detect when a topic or a story line changes in a raw video segment during off-line authoring of such content. Such a method would allow a video editor to concentrate on other editing tasks without being required to supervise the scene change detection process.

SUMMARY OF THE INVENTION

In a preferred embodiment of the present invention a method for editing an analog video presentation is provided, comprising steps of (a) extracting and time-stamping closed caption (CC) text; (b) digitizing the analog video; (c) determining the position of topic changes in the video presentation by analyzing the CC text; and (d) using the topic change positions in an edited version of the video presentation. Determination is made in part by comparing words in consecutive sentences in the CC text, and the words may be nouns or adjectives, or both.

In some cases, in step (d) there may be a substep for selecting keyframes from the video presentation to be used in the edited version as thumbnails representing the topic changes. Further, the thumbnails may be arranged in an array together with a video presentation window in the edited version, and selecting a thumbnail causes the video presentation to jump to the position of the keyframe in the video presentation. Also in some cases specific CC text is associated with individual ones of the thumbnails, and this text is displayed in a separate window as a result of a mouseover or other selection action.

In another aspect of the invention a system for automatically creating presentations for a video magazine is provided, comprising a digitizer and separator for receiving an analog video presentation having closed-caption (CC) text, separating the CC text as text files, and digitizing the video presentation; and an editing station. The system is characterized in that the editing station receives the digitized video and the text files, determines positions of topic changes in the video presentation by analyzing the CC text, and uses the topic change positions in preparing an edited version of the video presentation.

Determination of topic change position is made in part by comparing words in consecutive sentences in the CC text. The comparisons may involve nouns, adjectives, or both. Further, in preferred embodiments, the editing station selects keyframes from the video presentation to be used in the edited version as thumbnails representing the topic changes. The thumbnails may be arranged in an array together with a video presentation window in the edited version, and selecting a thumbnail causes the video presentation to jump to the position of the keyframe in the video presentation.

In some embodiments specific CC text is associated with individual ones of the thumbnails, and there is in these embodiments a text window for displaying the specific CC text associated with each thumbnail, the text being displayed in response to a mouseover of each thumbnail. Also in some embodiments the output of the digitizer, being text files and digitized video presentations, is sent to the editing station via the Internet.

Given the present invention, taught in enabling detail below, for the first time an automated editing system is provided that can receive analog video presentation having closed-caption text, digitize the video and extract the text, and use the text to determine topic changes in the video.

BRIEF DESCRIPTION OF THE DRAWING FIGURES

DESCRIPTION OF THE PREFERRED EMBODIMENTS

Figure 1:
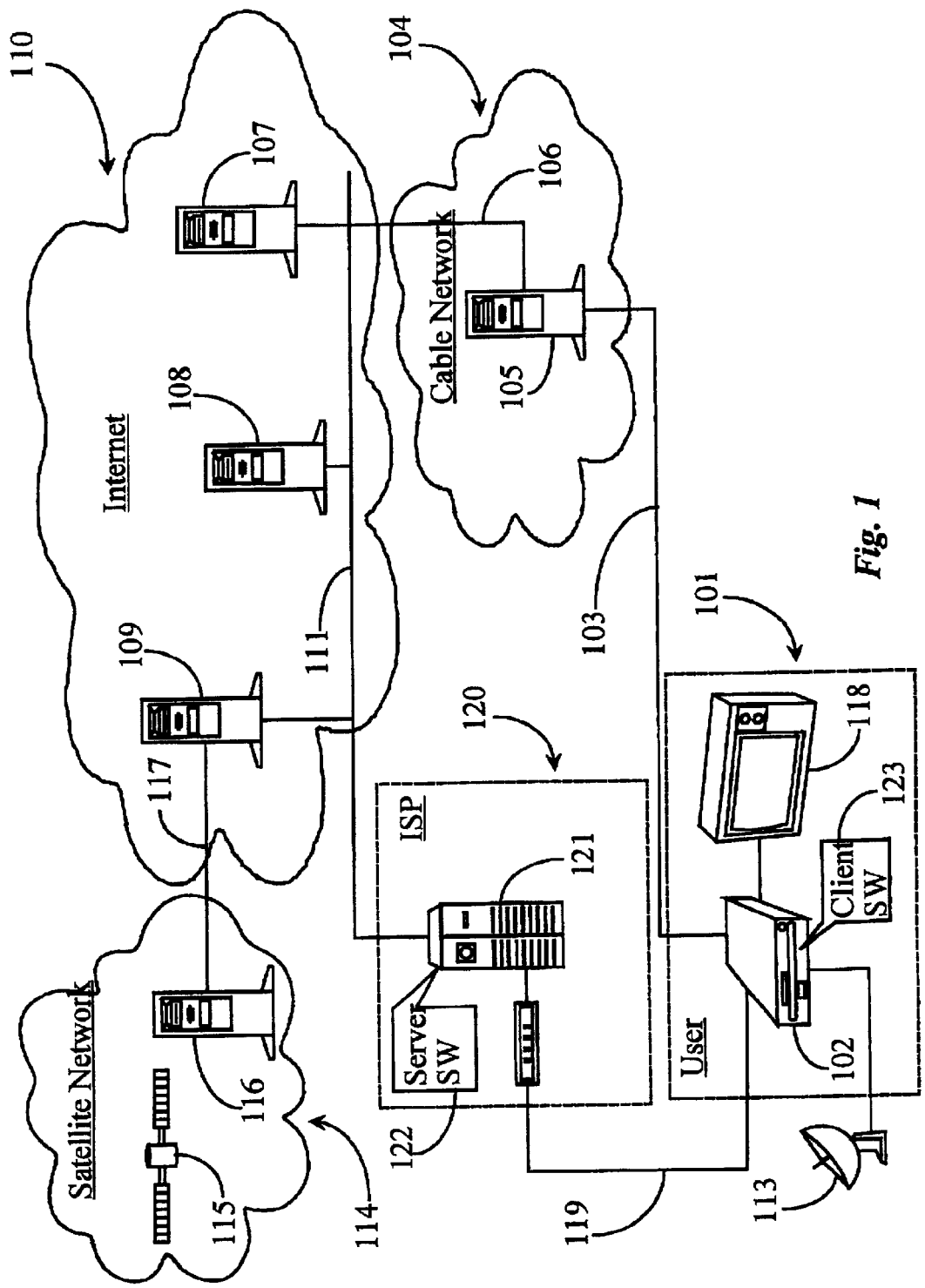
FIG. 1 is a system diagram illustrating an exemplary architecture for practicing the present invention.

According to a preferred embodiment of the present invention, a media-rich video magazine system is provided for education and entertainment of clients of a presentation service. FIG. 1 illustrates an architecture upon which the video-magazine system may be practiced. In FIG. 1 a user's premise 101 has a display 118, which may be a television set with computer integration, and a set top box 102 enabled to receive video streams, in this case, by three different ports. Video may be received at box 102 via cable link 103 from a cable network 104 having a server 105, which may alternately receive video via an Internet connection 106 for rebroadcast from exemplary Internet servers 107, 108 and 109 in Internet cloud 110, the servers loosely connected on Internet backbone 111. In most cases the cable link is a one-way link not providing a backlink to the user to interact with a video presentation served.

Box 102 in this example also has a satellite port 112 connected to a satellite dish 113 for receiving video streams from a satellite network 114 via a satellite 115 to which video stream is uploaded from a server 116 connected by link 117 to Internet cloud 110, and the box may thereby receive video streams via the satellite link as well. Again, in most conventional cases the satellite link is a one-way link, and no backlink is provided to the user, although the backlink limitation is not inherent.

Box 102 in this embodiment also has a land-line telephony modem connection 119 to an ISP 120 through which the box is connected to Internet 110 via server 121. There are other means by which video streams may be received by a user's station and by which the user may backlink to a sender for interaction with the presentation system. FIG. 1 is meant to illustrate several of the more common. In a simple case, as will be apparent with further disclosure below, a user with a PC may receive a video presentation and interact with that presentation according to an embodiment of the present invention through a single connection, such as a conventional Internet connection. Alternatively separate and disparate paths may be used for presentation to a user and user reaction using any of the alternatives apparent in architecture of FIG. 1, or other architectures.

In a preferred embodiment of the present invention a central server, typically a subscription server, is enabled to store and present a media-rich video magazine according to embodiments of the present invention to multiple clients (users). The subscription server may be any of the servers 107, 108, 109 in FIG. 1, server 121 of ISP 120, server 105 of cable station 104, or server 116 of satellite station 114. For illustration only this narrative will assume the subscription server is server 121 in ISP 120, and that all presentation and interaction is via land-line modem link 119. For this description Video Magazine software (Server software) 122 is illustrated as executing on server 121, and client software 123 is shown as executing on box 102.

The skilled artisan will be aware that the client station can take a number of forms, and there will be many client stations not all of the same form. All client stations, however, must be enabled to execute a client software to practice the invention. The arrangement shown is merely exemplary.

The video magazine made available to clients by server 121 (in this embodiment) has abstract features in common with more conventional hardcopy magazines. For example, in both cases authors compose presentations. In the hardcopy magazine the presentations are articles with pictures, while in the interactive video magazine of the present invention the presentations are interactive video presentations with client interactivity mechanisms wherein a viewing client may interact with, manage, and control the presentation. The articles in both cases can be of various kinds, such as documentaries or fiction stories. Both kinds of magazine have editors who assign tasks, control direction and content, and put together the various articles as a periodic new edition of the magazine. In both cases there may be departments and letters to the editor and the like. There are many other similarities.

Figure 2:
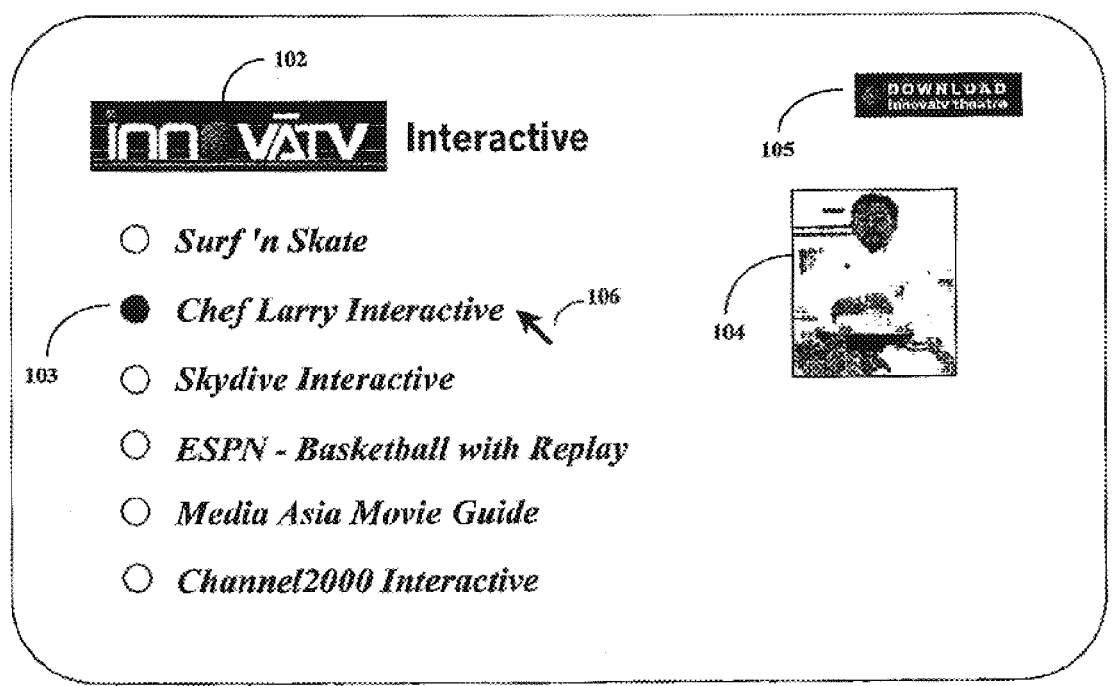
FIG. 2 is a first entry page for a video magazine according to an embodiment of the present invention.

FIG. 2 is a first page of an edition of an exemplary media-rich Interactive magazine according to an embodiment of the present invention. Window 101 is a display on a display screen at a user's station, such as TV 118 of station 101 (FIG. 1). This first page may be considered analogous in some respects to a table of contents for a hardcopy magazine, except this first page has greatly enhanced functionality.

First page 101 has an ID logo 102 identifying this magazine as an edition of Innovatv Interactive magazine. A list of selectable entries 103 comprise the presentations available in the current edition of the magazine. Selection is by moving a cursor 106 to the area of a listing and clicking on the area. A mouseover changes the color of a bullet at the head of each listing, indicating which presentation is about to be selected. The presentation which is thus highlighted also causes a picture to be displayed in a window 104, the picture being indicative of the presentation. In this example the Chef Larry Interactive presentation is highlighted, and a still of Chef Larry is displayed in window 104. A download button 105 is provided in this example enabling a viewer/client to download from the server software for interacting with the server to view magazine presentations. This is, in this embodiment, client software 123 (FIG. 1).

FIG. 2 indicates there are six presentations in the current edition of the magazine, these being, besides Chef Larry Interactive, Surf'n Skate, Skydive Interactive, ESPN—Basketball with Replay, Media Asia Movie Guide, and Channel2000 Interactive.

Figure 3:
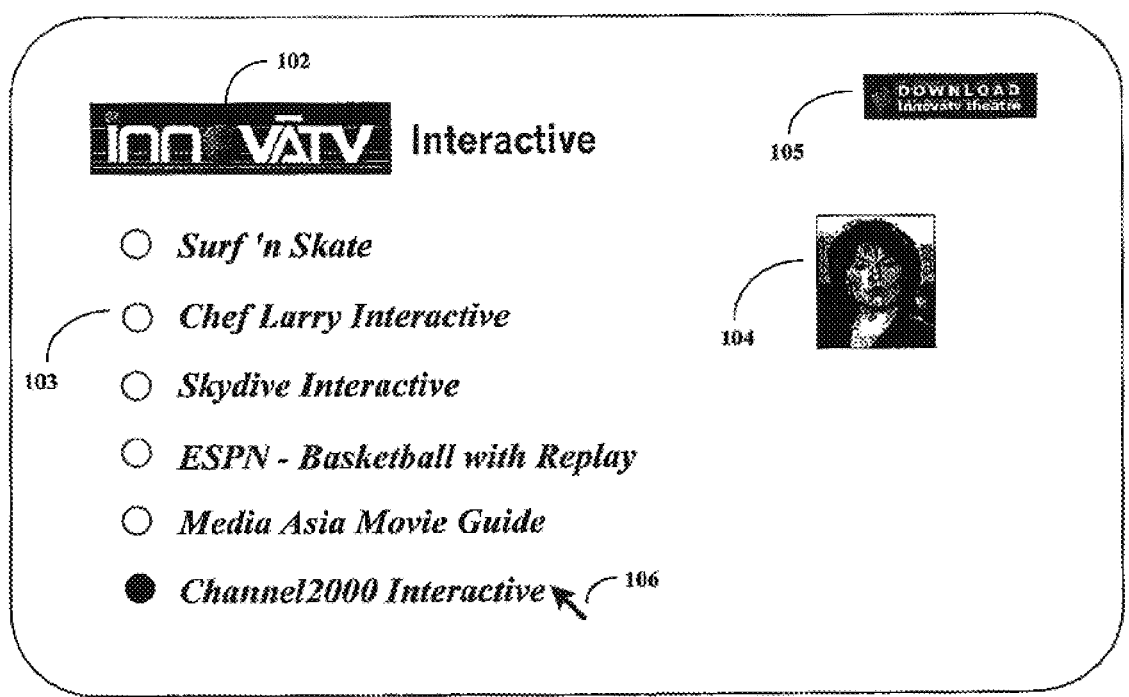
FIG. 3 is an second entry page for the video magazine.

FIG. 3 is another view of first page 101 with cursor 106 moved to highlight Channel2000 Interactive, and it is seen that window 104 now has a new picture, this being a picture of a reporter and narrator for Channel2000 Interactive.

Figure 4:
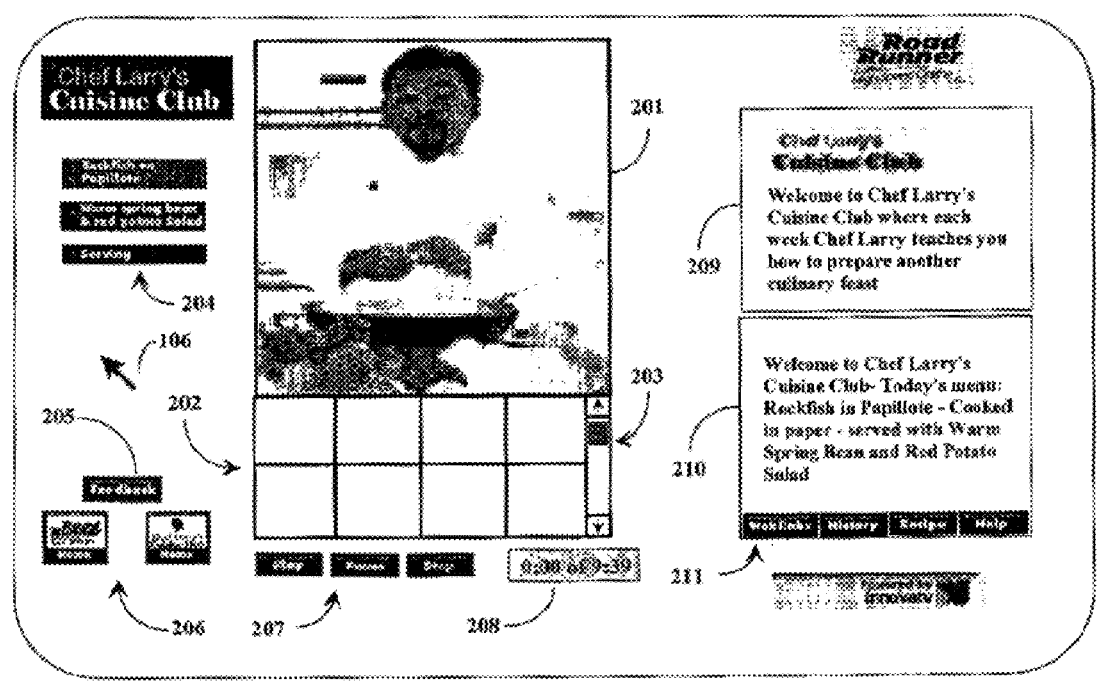
FIG. 4 is a presentation and control page for a presentation provided by the video magazine.

When a client selects one or another of the listed presentations shown in FIGS. 2 and 3, a backlink signal goes to server 121 (FIG. 1), which responds by serving a new page to the client, this being a control and presentation page dedicated to the particular presentation selected. FIG. 4 is the control and presentation page for Chef Larry Interactive, and is described below in enabling detail as representative of all the other presentations available in the magazine, all of the presentations having similar functionality.

The control and presentation page shown has a logo at the upper left for Chef Larry's Cuisine Club. A video window 201 provides an active video presentation selectable and controllable to a large degree by the viewer/client. The video presentation that will play in this case is one of three selectable from list 204. The three selections are Rockfish en Papillote, which shows in detail how to prepare the title dish; Warm Spring Bean and Red Potato Salad, which shows in detail how to make the side dishes to accompany the fish main course; and Serving, which shows the details of serving the courses properly and elegantly. Again selection is made by moving cursor 106 and using a pointer device input, such as a mouse. In this particular case the Rockfish en Papillote video is selected.

A dynamic time window 208 shows the current position of the video (0:00) and the total time (9:39) for the video. Play pause and stop buttons 207 are provided to enable the client to start, pause, and stop the video. A Stop signal causes the video to go to the start and wait for a Play signal.

In addition to starting, pausing and stopping, a set of thumbnails 202 is provided. Each thumbnail is a frame of the video at a natural scene change or transition point in the video. These may be thought of as Chapter headings in the video presentation. Note that there are eight thumbnails shown, but a scroll bar 203 enables there to be many more than the eight selectable thumbnails shown. No frames are shown in the thumbnails in FIG. 4 to avoid confusion of too much detail, but in the actual implementation the frames may be seen.

Selecting a thumbnail causes the video presentation to jump to the selected frame, and changes the time window 208 to indicate the time position in the video. Jumps may be from any position in the video to the selected position, and if the video is playing when a jump is made, the video automatically restarts at the jumped-to position. If the video is stopped or paused when a selection is made, the video jumps to the new position and indexes the time window, but waits for a play signal to play the video from the new position. One may thus jump to different related videos and to natural transition position within videos at will.

Window 209 provides additional info and selectable links. The text shown is a general comment for the video. When one selects a link in this window the video, if playing in window 201, goes to pause, and a new window (not shown) opens as a conventional browsing window to the new destination. When one leaves the new destination and closes the browsing window, the video resumes in window 201.

Window 210 provides text information specific to each video segment represented by a thumbnail. A row of buttons 211 across the bottom of window 211 enables a client to select content for this window. Weblinks takes the client to related Web sites, and behavior is as described above for jumps to outside Web sites. History accesses events already past in the video. Recipe provides a printable recipe for the dishes illustrated and taught in the available videos. Help takes the client to a tutorial on how the magazine system works.

Home buttons 206 enable a client to go to one of two selectable home destinations. One if the Chef Larry Cuisine Club home page and the other a RoadRunner home page, which is an access point for interactive magazines of the kind taught herein, and for other content as well.

Figure 5:
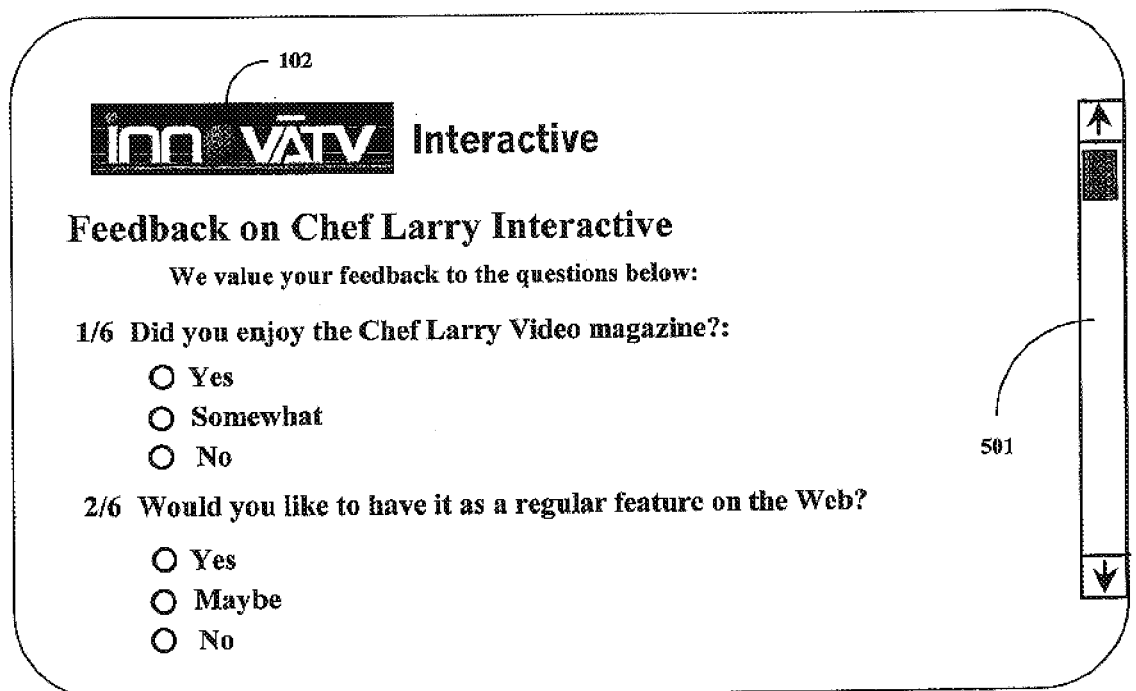
FIG. 5 is a feedback page for feedback from clients in the video magazine.

A Feedback button 205 takes a client to a feedback page shown exemplary in FIG. 5. The feedback page enables a client to answer a series of questions providing valuable feedback to the editors of the media-rich magazine. A scroll bar 501 enables the client to access all of the questions in a feedback list.

Just one of six available presentations in a media-rich Interactive Magazine has been taught herein, but the other five, although the appearance and implementation of interactive controls may differ (different backgrounds, different positions, certainly different video content related to the listed titles) the control and flow is similar. In each case a video window (201) is provided, there are Stop, Pause, and Play controls (207), each video presentation is parsed by thumbnails (202), more than one video on the title subject may be selectable (204), and extra windows with extra information and destinations are provided (209 and 210).

In alternative embodiment of the present invention a number of video magazines, each having plural presentation content and periodically updated to new content (just like a hardcopy magazine) may be made available through a subscription server. Again it is emphasized that the invention may be practiced in a variety of equipment configurations, both at the server and the client end. It will be apparent to the skilled artisan that the appearance of entry pages and the appearance and interface mechanisms of both these and the presentation and control pages may vary widely within the spirit and scope of the invention.

CC-Based Topic Change

In another aspect of the present invention, the inventor provides an off-line editing system that substantially automates and improves the process of creating transitions and transition thumbnails, and providing summary information related to those thumbnails for presentation in an interactive magazine, and for other more general purposes as well. The method and apparatus of this unique process is described in enabling detail below.

Figure 6:
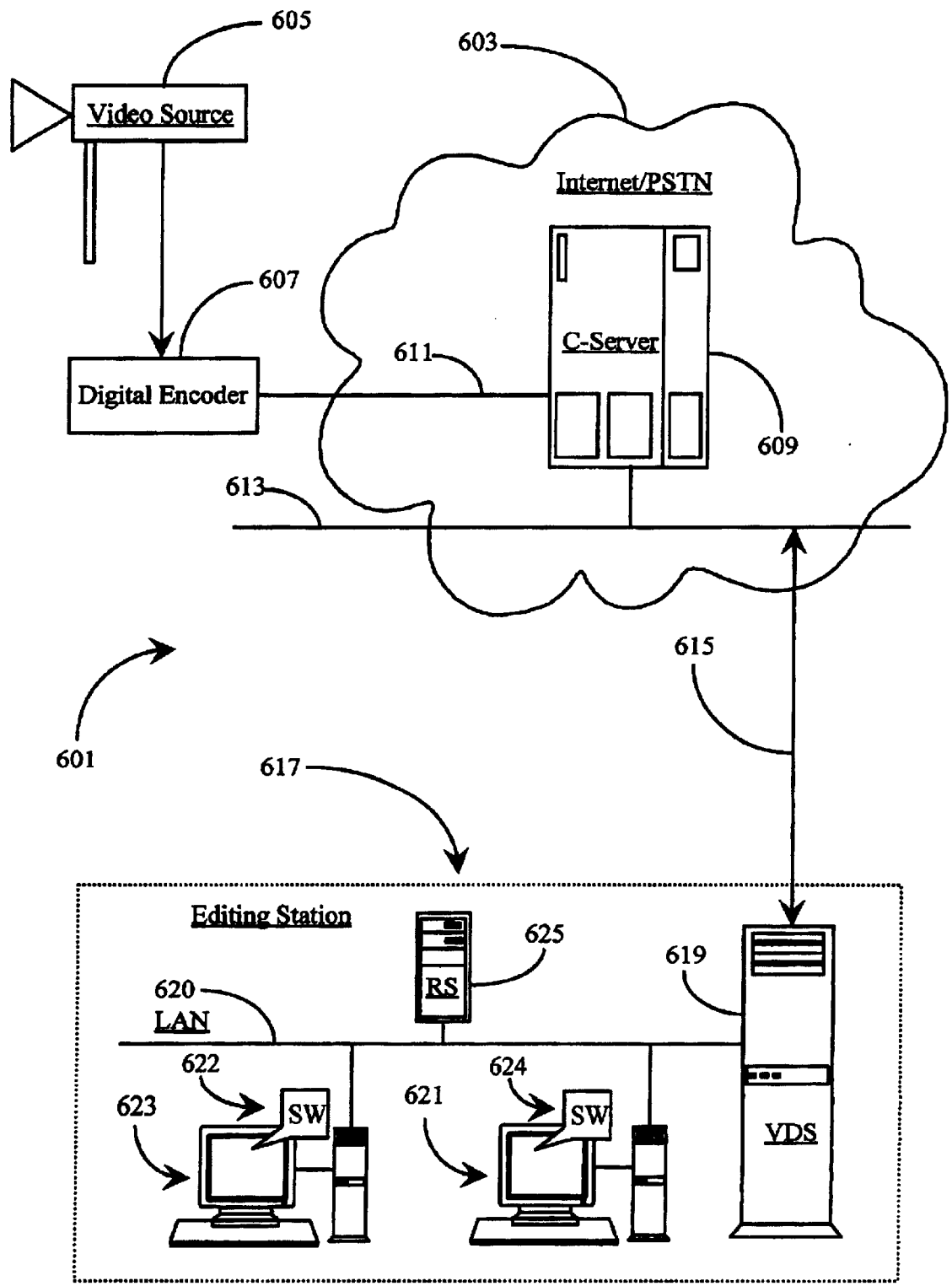
FIG. 6 is an architectural overview of an off-line video collection and editing process according to an embodiment of the present invention.

FIG. 6 is an architectural overview of an off-line video collection and editing system 601 according to an embodiment of the present invention. System 601 involves the collection of and editing of raw video content used, in this example, in preparation of an interactive magazine made available, in this embodiment, for download to users connected to the Internet network illustrated herein as element 603 (Internet/PSTN).

Internet/PSTN network 603 represents a preferred medium for collection of raw video content and redistribution of edited video content to a plurality of connected users. The inventor chooses to illustrate network 603 as an integration of the well-known Internet network and the PSTN network because of the ambiguity concerning the many shared lines and equipment existing in such networks. The fact that network 603 represents the Internet and the PSTN network is exemplary only of a preferred embodiment of the present invention chosen because of the high public access characteristic shared by both mediums. Any wide-area-network (WAN), including the well-known Internet network may be substituted for Internet 603 provided the appropriate data transmission protocols are supported. Moreover, PSTN 603 may be a private rather than a public access telephony network.

System 601 describes a largely automated system using distributed components dedicated toward advancing the goal of the present invention. In this example, an off-line editing station 617 is provided and adapted by virtue of equipment and software for receiving and editing video content into a form acceptable for re-broadcast or Internet-based server-download to users having the appropriate customer premises equipment (CPE).

A video source 605 represents one of many possible sources for raw video content that may be selected for editing and ultimate inclusion into, for example, an interactive magazine ready for presentation. Source 605 may be a cable studio, a television studio, or any other entity having possession of raw video content and equipment for transmitting the content for the purpose of authoring according to an embodiment of the present invention. Typically, source 605 handles a significant amount of analog content such as would be broadcast to public television and analog cable recipients. It is known that such analog content is typically closed-caption-enhanced (CC) for the hearing impaired.

An important object of the present invention is to exploit CC text for the purpose of determining topic changes to be used for various purposes, including the purpose of generating story-line changes and summary descriptions represented in many cases by thumbnails presented to users as an interactive tool with an interactive magazine presentation. To this end, editing functions of station 617 are limited in description to those functions pertaining particularly to the present invention. However, it will be appreciated that station 617 may perform a variety or other authoring functions and processes known to the inventor.

In this example, video source 605 loads analog video content such as news casts, educational programs and the like into an analog-to-digital encoder machine 607 typically at the site of video source 605. The encoder, however, may be elsewhere in the system. Encoder 607 is adapted to convert analog video content into a digital format suitable for transport over a digital packet network (DPN), in this case, Internet 603.

Encoder 607 has an additional capability provided for detecting and extracting CC text contained typically in the video blanking intervals (VBIs) of the analog video frames, and for recording the presentation time of the occurrence of CC text within the analog video. The output of encoder 607 is digital video organized in compressed data packets such as in the well-known Motion-Picture-Experts-Group (MPEG) or Audio Video Interleaved (AVI) format and separate digital CC text files similarly organized into data packets.

The output from encoder 607 is uploaded, in this example, by virtue of an Internet access line 611 into a video-collection server (C-Server) 609 within Internet 603. It is noted that in some cases analog content may be simply mailed to station 617 for editing purposes. However, the mechanism provided herein and illustrated by system 9 represents an automated enhancement for content delivery as is known to the inventor.

Collection server 609 is adapted to receive digital video and time-stamped CC text files from a plurality of content sources. Source 605 is intended to represent such a plurality. Server 609 is illustrated as connected to an Internet backbone 613, which represents all of the lines and connection points making up the Internet network in a global sense. In this respect, there are no geographic limitations to source 605, or to end users participating in the receipt and interaction with an interactive magazine as taught herein.

Editing station 617 has in this embodiment a video download server (VDS) 619. Server 619 is adapted to receive digital video content as well as digital CC text files from server 609 for video editing purposes in an off-line mode. Data connection between servers 609 and 619 is illustrated by an Internet-access line 615. Line 615 as well as line 611 between server 609 and encoder 607 may be any type of known Internet-access connection wired or wireless. Examples include cable/modem, ISP, DSL, ISDN, satellite, and so on.

Once content is received and (typically) registered in VDS 619, the content may be distributed for editing. A local area network (LAN) 620 is provided in this embodiment within station 617 and illustrated as connected to VDS 619. LAN 620 is adapted to support the appropriate communication and data transmission protocols used for transporting data over the Internet. Connected to LAN 620 are a reference server (RS) 625 and two exemplary editing workstations, workstation 623 and workstation 624. Workstations 623 and 624 are adapted as computer editing machines, which may be automated in some instances and manned in other instances. For the purpose of the present invention it will be assumed that stations 623 and 624 are un-manned and automated when performing the editing processes that are taught further below.

Workstations 623 and 624 are illustrated as computers, each comprising a processor/tower and a connected monitor which presents a graphical-user-interface (GUI). It is important to note here that a single workstation, if powerful enough, may practice the present invention without the aid of a second station. In this example, however, two workstations are illustrated with each workstation performing different parts of the editing process according to an embodiment of the present invention.

RS 625 is adapted as a server containing reference data used by workstations 623 and 624 in the course of editing. The exact nature of the above-mentioned reference data and the dedicated function of RS 625 is explained further below.

Workstation 623 has an instance of software (SW) 622, which is provided to execute thereon and adapted to edit and process CC text files associated with a digital presentation for the purpose of determining points or junctures representing new topics or story-line-changes contained in the video. Workstation 621 has an instance of software (SW) 624, which is provided to execute thereon and adapted to utilize process results passed to it from workstation 623 for the purpose of selecting keyframes of a digital video segment and generating interactive thumbnails which represent the junctures in the segment where a topic or story line has changed.

By virtue the separate natures of SW 622 and SW 624 as described above, it is noted herein that workstation 623 receives only CC text files from VDS 619 for processing while workstation 621 receives only the digital video segment associated with the CC text files received by workstation 623. In this way, workstations 623 and 621 have a dependent relationship to each other and work in concert to complete editing processes for any given video segment. In this relationship, workstation 621 has a digital player (SW not shown) provided therein and adapted to allow workstation 621 to receive and play digital video for the purpose of selecting keyframes and generating thumbnails representing those keyframes.

In an alternative embodiment, a single instance of SW of the present invention may be adapted with the capabilities of both instances 622 and 624, and may be provided on a single workstation adapted to receive both CC text files and the associated video segments. In this case, workstations 623 and 621 would operate independently from one another and could work on separate video segments simultaneously.

In practice of the present invention, analog video content from source 605 is loaded into digital encoder 607 wherein CC text is extracted from the VBI portions of the video to produce an output of CC text files time stamped to their original locations in the video segment. The analog video is converted to a digitized and compressed video stream. Output from encoder 607 is uploaded into c-server 609 in Internet 603 over access line 611. VDS server 619 retrieves associated video files and CC text files from server 609 over access line 615 either by pull or push technology.

VDS server 619 in this embodiment routes CC text files over LAN 620 to workstation 623 for processing while the associated video files are routed to workstation 621. Workstation 623 running SW 622 processes CC text files according to an embodiment of the present invention and passes the results to workstation 621. Workstation 621 running SW 624, which includes a video player, utilizes CC text results to select keyframes from the video. Workstation 621 then generates interactive thumbnails from the selected keyframes representing topic or story-line-change occurrences in the video. Selected text summaries are interactively linked to each representative thumbnail. The output from workstation 621 is passed on to VDS 619 where it may be uploaded to a video-presentation-server (VPS not shown) connected to backbone 613 and accessible to end users.

Alternatively, edited content may be sent via digital cable or the like to a video broadcast server for transmission over digital cable to end users according to schedule. In a preferred embodiment, the Interactive magazine of the present invention is held in Internet network 603 at an appropriate VPS server for on-demand user-access by virtue of Internet connection and download capability.

It will be apparent to one with skill in the art that the architecture presented herein may vary somewhat in specific dedication and connection aspects without departing from the spirit and scope of the invention. For example, instead of an editing station having a LAN with individual workstations connected thereto, one powerful server may be provided and adapted to perform all of the automated editing functions described herein.

In one embodiment, source content may be delivered directly to off-line station 617 via digital cable instead of using the Internet as a video collection medium. Likewise, equipment and SW required to create an interactive magazine from source material may be provided at source locations where it may be edited and then delivered directly to broadcast or download points. There are many possibilities. The architecture and connection methods illustrated in this example are intended to represent a configuration that promotes automation and streamlined services according to a preferred embodiment among many possible alternative embodiments.

Figure 7:
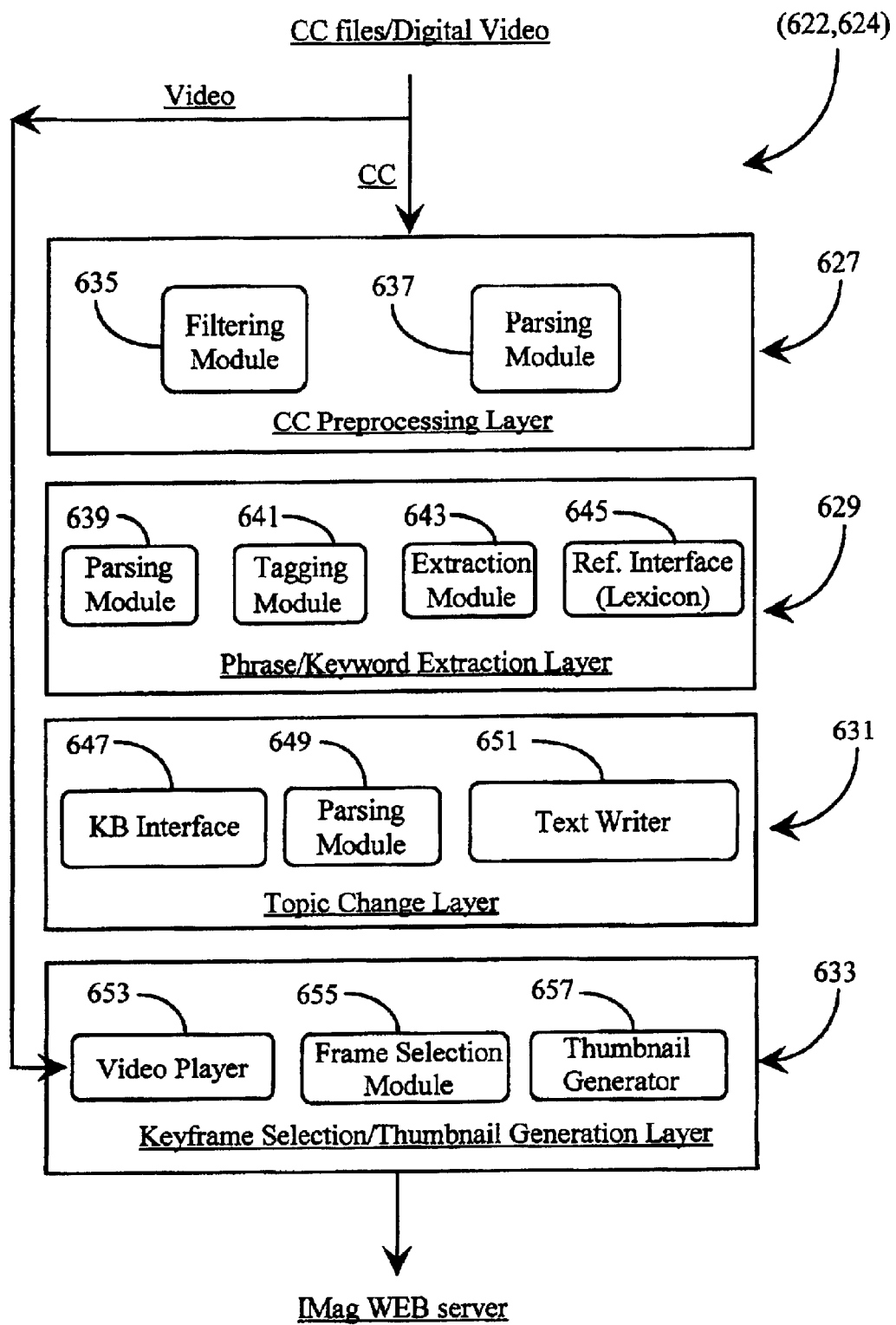
FIG. 7 is a block diagram illustrating topic change detection and thumbnail-summary generation software according to an embodiment of the present invention.

FIG. 7 is a block diagram illustrating topic-change detection and thumbnail-summary generation software 622 and 624 according to an embodiment of the present invention. SW (622, 624) is illustrated as one layered application in this example, however, individual components thereof may be provided in a distributed fashion on more than one machine as was illustrated in FIG. 6 with SW 622 on workstation 623 and SW 624 on workstation 621.

SW (622, 624) comprises at least four SW layers 627, 629, 631, and 633. Each layer 627–633 is presented according to a hierarchical order of function starting from top to bottom. Arriving time-stamped CC files and digital video are split, with CC files going to a CC pre-processing layer 627 and the digital video going to a Keyframe-Selection/Thumbnail Generation layer 633.

Layer 627 acts to pre-process raw CC text such that it is presentable to the next SW layer 629. To this end, layer 627 contains a filter module 635, which is provided and adapted for eliminating unwanted characters present in the CC text that do not comprise actual words or punctuation. Layer 627 also contains a parser module 637, which is provided and adapted to "read" the CC text from each serial file and to identify and tag whole sentences as they appear serially from file to file in serial fashion.

Though certain closed caption text has special characters like '>>>' or '>>' to indicate a context change or a speaker change, they don't clearly define any topic boundary.

In operation of parser module 637 in layer punctuation marks are first separated from the words in order to simplify the tagging process. For example, given the text Mack (to John) said: "How much do you have?" I want $10. The parser module adds spaces to render the string as Mack (to John) said: "How much do you have ? " I want $10. Next the CC texts are grouped into discrete sentences by analyzing the punctuation. Period ('.'), Exclamation mark ('!') and Question mark ('?') are used as sentence terminators. In some cases the Period ('.') need not be sentence terminator, and these are guided by rules. (e.g. 'www.innovatv.com', '$1290.90').

SW layer 629 functions as a phrase and keyword extraction layer as is labeled. Layer 629 acts to identify key nouns, verbs and subjects contained in the CC text. A parsing module 639 is provided and adapted to scan incoming CC sentences identified in layer 627. A reference Lexicon interface 645 is provided and adapted to allow a SW interface to a separate database listing nouns, verbs and phrases. A lexicon (not shown) or other reference library, to which interface 645 allows access, may be provided on a LAN-connected server as represented in FIG. 6 by RS server 625 connected to LAN 620 in editing station 617. A lexicon is a database of words and their most probable parts-of-speech, which is generated by using a manually tagged corpora, viz. PennTreeBank. A sample listing of Lexicon is shown below:

CAN [NN VB]
DECLINE [NN VB]
ABRAHAM [NNP] and so on.

The above listing states that the word CAN and DECLINE could be a noun or a verb, ABRAHAM is a proper noun.

Parser 639 works in conjunction with a tagging module and interface 645 to tag each word with the parts-of-speech it belongs to in the context of the CC sentence. This tagging is achieved in two stages. In the first stage the words are tagged by a simple look-up on the reference lexicon. And in the second stage, based on predefined rules the tags are modified to be in accordance with the context of the sentence. The output of parser 639 is fed to Phrase Extraction Module 643, which identifies the noun phrases, verb phrases, subject-nouns, and subject phrases. This process is performed according to the rules pre-set by the hosting enterprise.

The phrase rules contain a list of tag sequences that determine the phrase. For example, one of the tag sequences in the 'noun phrase tag rule' is "Determiner Noun" implying two consecutive words tagged as Determiner and Noun respectively would comprise a noun phrase.

Once the phrases are extracted, the Phrase Extraction Module 643 decides whether the CC sentence is complete. i.e. has a subject noun/noun phrase and has a predicate (a verb phrase followed by a noun phrase). Module 643 also decides the degree of dependency of the CC sentence to the previous sentence. This is performed by determining if the pronoun words have any antecedent noun in the same sentence. If the antecedent nouns are in the same sentence then the CC sentence is not dependent to the previous one and is dependent otherwise. For example: Wilson is expected to take the stand today in the sanity phase of his trial.

Here Wilson is the antecedent noun to the pronoun his and this is a complete sentence, so this is not dependent to the previous one. On the other hand, consider the sentence: There is a possibility that he may be trying to locate family in Mexico. The pronoun he does not have any antecedent noun in the sentence and is hence dependent on the previous sentence.

Based on the number of pronouns, which have the antecedent nouns in the same sentence, and the number of pronouns which do not have, a dependency factor is assigned to the CC sentence.

The CC sentences with low dependency factors are forwarded to layer 631 for further processing.

SW layer 631 functions as a topic change decision layer as is labeled. Layer 631 acts to determine when a topic change occurs based on rules including noun comparison as taken from tagged CC text sentences passed to it from layer 629. Layer 631 compares the identified subjects and nouns with most recently entered subjects and nouns with the aid of an adaptive knowledge base (KB). A KB interface module 647 is provided and adapted to allow SW access to a suitable KB.

An adaptive KB (not shown) may be held in RS 625 (FIG. 6) as described above in reference to Lexicon interface 645 of layer 629. A parser module 649 is provided and adapted to read the tagged sentences and to identify the nouns (keywords) contained therein. Parser 649 is similarly adapted to compare the most recent nouns with previously read nouns and indicate a topic change if the nouns do not suitably match. A text writer 651 is provided within layer 631 and is adapted to write a text summary comprising the first sentence or two marking a topic change. The summary will be used to describe a generated thumbnail depicting the new topic change as will be described below. The text writer also provides keywords for the particular topic.

An example of CC processing for topic change is presented below as might be taken from a news story describing a current disaster. A complete sentence extracted from CC text reads "Hundreds of people are dead, scores more are injured after a devastating earthquake in Taiwan". Extracted nouns include people, earthquake, and Taiwan. If these nouns are not found in comparing with recent nouns extracted from previous sentences in CC text, then a decision is made that a new topic or story has begun in the newscast. If the same nouns, or significant instances, are found, then the decision is that the topic has not changed.

A next sentence, for example, reads "Taiwan's government is now saying more than 1,500 people have died following the devastating earthquake". Extracted nouns include Taiwan, government, people, and earthquake. A preponderance of the newly extracted nouns match recently extracted nouns therefore, the topic of the earthquake in Taiwan is still the same and has not changed.

A next extracted sentence reads "Residents along Florida's West Coast are bracing for tropical storm Harvey". Extracted nouns include residents, Florida, storm, West Coast, and Harvey. None of the newly extracted nouns match most recently extracted nouns. Therefore, there has been a topic change and a new story (about tropical storm Harvey) is being reported. Text writer 651 now utilizes the first few sentences marking the new topic as a summary for a generated thumbnail depicting storm Harvey.

It will appreciated by one with skill in the art that the method and apparatus of the present invention can be used to identify topic or story line changes that occur in a wide variety of video content accompanied by CC text. In this example, a news program was chosen because the occurrence of several significantly unrelated stories in a same video segment provides distinct and clear topical definition from one topic to another. However, it may be that changing from one topic to another is less clearly defined. Such might be the case if two adjacent stories are closely related by nouns such as two separate fires burning in a same state.

An adaptive knowledge base in one embodiment of the invention plays a part in refining topic change techniques by providing more dynamic rules for comparing sentences. For example, if most of the newly entered nouns match those of the previous sentences but a few adjective words are markedly different from the same type of adjective words from previous sentences, then a new topic may be indicated. In an example, using a news coverage of two separate fires, CC phrases from the first story may read "A six thousand acre fire is burning in the Ventura County area at this hour. Mandatory evacuations have been ordered for southern portions of the county". CC sentences taken from the second story may read "Fire has burned 700 acres in the Shasta Trinity Forrest in Trinity County and continues to grow. There are no plans for immediate evacuations of the area."

It will be appreciated that the selected CC sentences appear very closely related in noun content. For example, the nouns common to both sets of sentences are fire, acre, area, evacuations and county. Nouns that are different include just Ventura and portions (first set), as opposed to Trinity and Forest (second set). Categorically speaking, the two separate stories fall under the same topic. If judged by nouns alone, the separate stories may be judged as one topic hence no topic change. A generated thumbnail may show the first fire and be annotated with details of the first fire while completely ignoring any detail about the second fire.

By including a rule that considers proper nouns, adjective words and phrases into a categorical knowledge base, it would be clear that "Ventura" County is logically different from and geographically remote from "Trinity" County and that "6000" acres is far different than "700" acres. Therefore, a conflicting flag status indicating more than one logical conflict between the two sets of sentences could be used to indicate the topic change. An adaptive KB may be refined as the process continues by the addition of and categorization of many words and phrases.

The entire process performed by layers 627–631 may be adapted somewhat to the type of CC dialog content loaded into the processing sequence by pre-configuring rules and pre-loading a KB with similar categorical content for comparison. For example, a romantic movie may be judged by such dialog falling under the categories of love scenes, fight scenes, character interaction changes, and so on. There are many possibilities. Moreover, traditional SCD technologies may also be intermittently used where CC dialog is absent or slow.

Referring again to FIG. 7, layer 633 is responsible for key-frame selection and thumbnail generation as labeled. Layer 633 receives indication of a new topic change by presentation time stamp (where the change is indicated in the video segment) from layer 631. Layer 633 also receives a text summary rendered by text writer 651 of layer 631 to be used for annotating a generated thumbnail. As previously described, layer 633 receives the video files associated by reference (time stamp) with the CC text files processed in layers 627–631. A SW video player 653 is provided and adapted to play the video segment frame by frame with capability of indexing to segments or frames indicated by time stamp.

A frame selection module 655 is provided within layer 633 and adapted to select a key frame appearing after indication of a topic change. A key frame represents a still shot appearing after a new topic has been detected. Rules regarding the exact key frame selected are pre-set by the hosting enterprise. For example, in a wholly automated embodiment, the rule may indicate to take the fifth frame after a topic change marker.

In one embodiment, a live editor may randomly check selected frames to make sure they match the new topic. Once a key frame is identified and selected, a thumbnail generator is provided for the purpose of producing an annotated thumbnail representing the topic change for insertion into an interactive magazine. The annotated portion of a user-selected thumbnail appears in a separate window as the result of a user initiated action such as a "mouse over", which is a common cursor action. Each generated thumbnail represents a story or topic with the annotation thereof being the first few sentences describing the new topic. Generated thumbnails appear near the main window of an interactive magazine next to each other in logical (serial) order according to how they appear in the video as is further described below.

Figure 8:
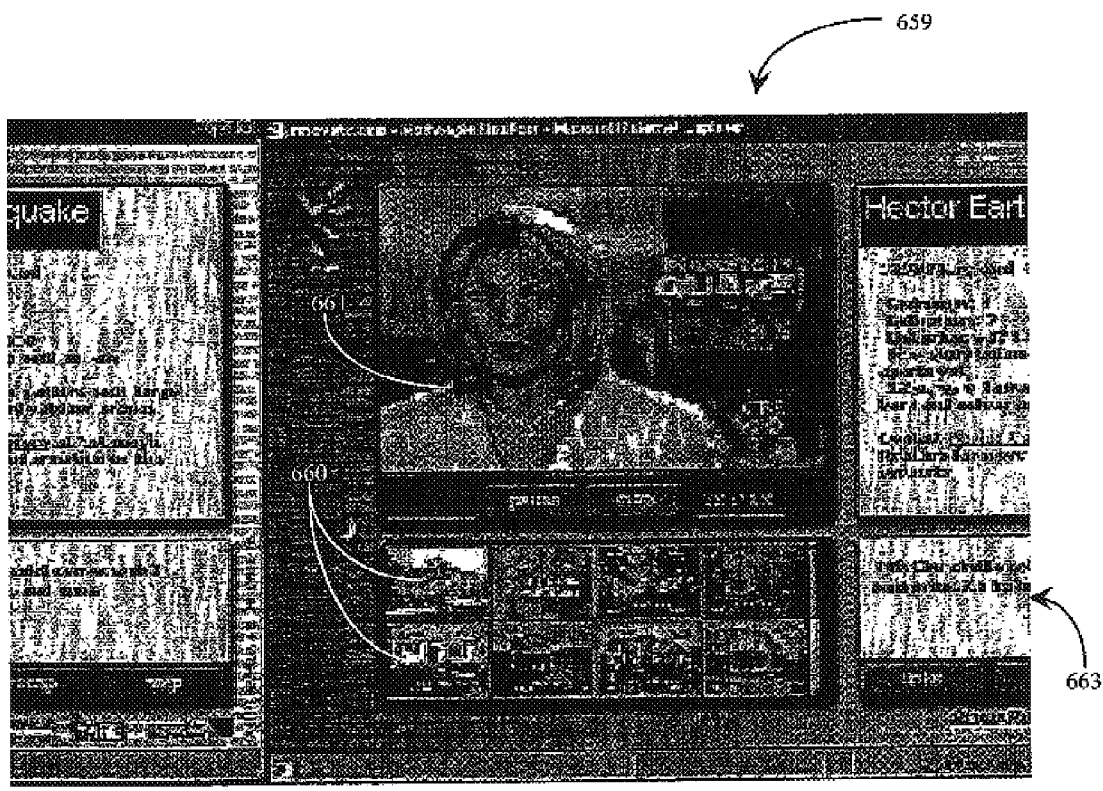
FIG. 8 is a screen shot of an I-Mag user-interface illustrating topic-change thumbnails and a topic-summary block according to an embodiment of the present invention.

FIG. 8 is an actual screen shot of an I-Mag user-interface illustrating topic-change thumbnails 660 and a topic-summary block 663 according to an embodiment of the present invention. I-Mag 659 appears on a user's monitor display as a playing movie with interactive controls and features accessible through cursor movement and selection. In this example, a news story about an earthquake is playing in a main window 661. Generated thumbnails 660 representing topic changes selected by mining CC text within the story of the earthquake appear below main window 661 and are placed in logical order from top-left to bottom right. If there are more thumbnails than may fit in the area provided for the purpose, then a scroll feature may be added to allow a user to scroll through additional thumbnails.

In this example, listed thumbnails 660 represent topic changes within a same story covering a broad topic. However, it may be that only the first thumbnail represents the earthquake story and the remaining thumbnails 660 each represent different topical stories. This may be the case especially if the stories are very short. In still another example, a combination may be present such as the first three thumbnails representing topic changes in a first story; the fourth and fifth representing changes in a second story; and the sixth through eighth representing changes in a third story, and so on.

Information block 663 is provided as a separate window in this embodiment. Window 663 is adapted to display a summary-text description of a thumbnail when the thumbnail is indicated by a mouse over or other cursor or keyboard action. When a user moves the on-screen cursor over one of thumbnails 660, the appropriate text appears in window 663. If so desired, the user may elect to jump to that portion of the video by clicking on the appropriate thumbnail. A double click may bring up yet additional features like listing relative URL links related to that particular thumbnail. There are many possibilities.

After interactive thumbnails have been created and linked to appropriate annotation summaries, the completed and edited video is packaged and uploaded to an I-Mag WEB server and held for on-demand access by WEB users as illustrated by a directional arrow labeled I-Mag WEB server.

It will be apparent to one with skill in the art that there may be more or fewer software modules present in the functional layers illustrated herein without departing from the spirit and scope of the present invention. For example, an additional software module for detecting commercials (not shown) may be provided to execute as part of the function of layer 633. Such a module may use a number of methods for determining the presence of a commercial. Among these are traditional SCD color variance or sound variance technologies. A commercial detecting module could also use the CC text to note that there's an ensuing commercial. E.g. a CC text reading Stay with us or Coming up next etc. would mean that a commercial is following. A rule base defining such texts indicating an ensuing commercial could be used. Such a module for detecting commercials may also be provided at the front of the CC processing sequence and note the commercials by the absence of CC captions.

In an alternative implementation of the present invention, in situations where CC text is not available, the invention may be accomplished by substituting a voice-to text (VTT) capability for the CC extraction. In this case, text versions of the voice track are created, and then analyzed and parsed in the same manner described above for the CC text. In a sense, in this embodiment, the CC text is being created on-the-fly, and then used as though it were available to be stripped, as in the examples described above.

It will also be clear to the skilled artisan that the example of a video magazine is but a single example of uses of embodiments of the present invention. The invention in more general terms provides a general technique for processing video clips and streams for topic changes. As a more general example, consider the case of a large video repository, wherein large numbers of video clips are collected and stored for future use. One may apply the techniques and apparatus of the present invention to analyze such video content for topics and for topic change interfaces, and may categorize the content according to the results.

As an example of more general use, assume a video library dedicated to tracking world-wide news events, and for following continuing developments in such events. One may collect the video by any conventional means, then process it according to embodiments of the present invention, using CC and/or VTT, and then parsing and text analysis to determine topics and topic changes. In the same process, global definition may be applied to store the processed content according to specific categories. For example, the system will be able to associate all topic sections about the Clinton scandal, the Gulf War, the presidential election, and so forth. Within the topic categories further categorization may be done, such as within the Gulf War category, topic sections may be established for land war, air war, and sea war, as well as for interest topics such as poison gas and the like. Through analysis hierarchical categorization may be done which will make later searching much more economical than previously. When a search is needed the search can be limited by invoking the higher-level categories.

The method and apparatus of the present invention may be used in the preprocessing of any video content accompanied by CC text or voice content, regardless of language. Moreover, rules governing the method of mining CC text and what parts of the text are compared in determining topic or story line changes may vary widely according to desire and material content. The invention should thus be granted broad latitude and be limited only by the claims, which follow.

What is claimed is:

1. A method for editing an analog video presentation, comprising steps of:

(a) extracting and time-stamping closed caption (CC) text;
    (b) digitizing the analog video;
    (c) determining the position of topic changes in the video presentation by comparing one or both of nouns and adjectives from scene to scene, and determining a topic change when one or more nouns or adjectives change in the CC text; and
    (d) using the topic change positions in an edited version of the video presentation.

2. The method of claim 1 wherein, in step (d) there is a substep for selecting keyframes from the video presentation to be used in the edited version as thumbnails representing the topic changes.

3. The method of claim 2 wherein the thumbnails are arranged in an array together with a video presentation window in the edited version, and selecting a thumbnail causes the video presentation to jump to the position of the keyframe in the video presentation.

4. The method of claim 2 wherein step (d) also includes a substep for selecting specific CC or created text to be associated with individual ones of the thumbnails.

5. The method of claim 4 wherein the edited version further comprises a text window for displaying the specific CC or created text associated with each thumbnail, and text is displayed in response to a mouseover of each thumbnail.

6. A system for automatically creating presentations for a video magazine, comprising:

a digitizer and separator for receiving an analog video presentation, separating any CC text as text files, and digitizing the video presentation; and
    an editing station;
    characterized in that the editing station receives the digitized video and the text files, determines positions of topic changes in the video presentation by comparing one or both of nouns and adjectives from file to file, and determining a topic change when one or more nouns or adjectives change in the text files, and uses the topic change positions in preparing an edited version of the video presentation.

7. The system of claim 6 wherein the editing station selects keyframes from the video presentation to be used in the edited version as thumbnails representing the topic changes.

8. The system of claim 7 wherein the thumbnails are arranged in an array together with a video presentation window in the edited version, and selecting a thumbnail causes the video presentation to jump to the position of the keyframe in the video presentation.

9. The system of claim 7 wherein specific CC or created text is associated with individual ones of the thumbnails.

10. The system of claim 9 wherein the edited version further comprises a text window for displaying the specific text associated with each thumbnail, and the text is displayed in response to a mouseover of each thumbnail.

11. The system of claim 6 wherein the digitizer sends the digitized video and time-stamped text files to the editing station via the Internet.

12. A method for editing an analog video presentation, comprising steps of:

(a) creating text versions of audio language content;
(b) digitizing the analog video;
(c) determining the position of topic changes in the video presentation by comparing one or both of nouns and adjectives in the created text, and determining a topic chance when one or more nouns or adjectives change in the text; and
(d) using the topic change positions in an edited version of the video presentation.

13. A system for automatically creating presentations for a video magazine, comprising:

a digitizer and separator for receiving an analog video presentation, creating text versions of audio language content, and digitizing the video presentation; and
an editing station;
characterized in that the editing station receives the digitized video and the created text, determines positions of topic changes in the video presentation by comparing one or both of nouns and adjectives from in the created text, and determining a topic change when one or more nouns or adjectives change, and uses the topic change positions in preparing an edited version of the video presentation.

* * * * *